Patented July 10, 1951

2,559,578

UNITED STATES PATENT OFFICE 2,559,578

RESINOUS COMPOSITIONS AND PROCESS OF MAKING SAME

Tzeng-Jiueq Suen, Old Greenwich, Conn., assignor to American Cyanamid Company, New York, N. Y., a corporation of Maine No Drawing. Application March 5, 1947, Serial No. 732,647

5 Claims. (Cl. 260—69)

This invention relates to a new series of urea-aldehyde resins modified with an inorganic salt and, more particularly, it relates to urea-formaldehyde resins modified with an alkali metal salt of sulfurous acid and a process of preparing said resins.

U. S. Patent Nos. 2,407,599 and 2,412,855 teach the process of reacting at reflux urea, an aldehyde, and an alkali metal salt of sulfurous acid to effect a water soluble thermosetting resin which may be converted to an infusible, insoluble state suitable for ion exchange purposes. This invention is directed to a process and product obtained thereby, wherein a resinous composition is prepared which will remain liquid at relatively high temperatures and will increase in viscosity and finally set upon cooling. Another phase of this invention is directed to the process of controlling the viscosity to the desired degree, and a still further embodiment of the invention is directed to the process of obtaining dried products of the desired degree of polymerization which will be water soluble. Included among the objects and advantages of this invention is the procedure of reversing the degree of polymerization of the resinous product.

The foregoing and other objects and advantages of this invention are attained by effecting reaction between urea, an aldehyde, and particularly formaldehyde, and an alkali metal salt of sulfurous acid at a pH and temperature at which there is no viscosity increase, and then effecting a condition by reducing the temperature such that the viscosity of the reaction mixture increases. The reaction is reversible by proper control of pH and temperature.

Although the mechanism of the reaction has not yet been completely understood, it appears that two reversible reactions proceed simultaneously in the systems under consideration. For the sake of convenience, these two reactions are called "polymerization" and "depolymerization." At higher temperatures and proper pH conditions, the rate of depolymerization exceeds the rate of polymerization. Therefore, there is no viscosity increase, even after prolonged heating. By lowering the temperature of the system to below a critical point, the rate of polymerization becomes greater than the rate of depolymerization, and the viscosity begins to increase. Furthermore, both the rate of polymerization and the rate of depolymerization depends on pH value. Consequently, pH in conjunction with temperature, can be adjusted to control the rate of viscosity increase. The optimum pH and temperature to be used vary with the proportion of sulfite employed and urea-aldehyde ratio. For any given urea-aldehyde ratio, lower temperature and pH may be used as the proportion of sulfite is increased.

The invention will be more fully understood from the description in the following examples given by way of illustration.

Example 1

Ninety one (91) parts of sodium metabisulfite was dissolved in 1622 parts of a 37% aqueous formaldehyde solution and the pH of the solution adjusted to 9.0 by adding 5.2 parts of 10% sodium hydroxide. Four hundred and eighty (480) parts of urea was added, and the mixture refluxed for 30 minutes in a suitable reaction vessel equipped with a stirrer, a thermometer, and a reflux condenser. The mixture was then cooled to about 80° C. and 15.7 parts 10% hydrochloric acid was introduced to lower the pH to 1.9. The addition of the acid raised the temperature to about 90° C. The reaction mixture was refluxed for 1 hour, and the pH was found to have risen to 2.0. The reaction mixture was then cooled to 45° C. and maintained at this temperature. Samples were taken every 40 minutes and neutralized immediately. The samples had the following viscosities:

| Sample | Viscosity at 25° C. (Gardner-Holdt) | Viscosity in Centipoises |
|---|---|---|
| 1 | A1–A | 40 |
| 2 | B+ | 70 |
| 3 | C | 85 |
| 4 | D+ | 105 |
| 5 | E+ | 130 |
| 6 | G– | 160 |

These resin samples were miscible with water in all proportions. By spray drying of the last sample at a temperature below 300° C., a water-soluble powder was obtained.

Example 2

The procedure of Example 1 was followed. In lowering the pH, after the initial reaction under alkaline conditions, 4.7 parts of concentrated hydrochloric acid was used, and the pH was 1.75. After 1 hour refluxing, the pH rose to 1.91 and was again lowered to 1.85 with 2.6 parts of 10% hydrochloric acid. The reaction mixture was aged at 45° C. Samples taken every 10 minutes and neutralized immediately had the following viscosities:

| Sample | Viscosity at 25° C. (Gardner-Holdt) | Viscosity in Centipoises |
|---|---|---|
| 1 | B– | 60 |
| 2 | C+ | 80 |
| 3 | D | 100 |
| 4 | E | 125 |
| 5 | F | 140 |
| 6 | G | 165 |
| 7 | H | 200 |
| 8 | | |
| 9 | J | 250 |
| 10 | K | 275 |

Example 3

The procedure of Example 1 was followed. The pH was 1.8 after the addition of the concentrated hydrochloric acid. The reaction mixture was refluxed for 5½ hours. The viscosity of the solution, taken with neutralized samples at 25° C. by Gardner-Holdt method, was A1 throughout the period. When allowed to cool to 40°–45° C., its viscosity gradually increased, and finally it formed a gel.

Example 4

The procedure of Example 1 was followed. After the initial reaction under alkaline conditions, the pH was lowered to 2.25 with hydrochloric acid. As soon as the acid was added, the reaction mixture was cooled to 50°–55° C. The viscosity began to increase gradually. After being maintained at this temperature for 1 hour, the resin syrup was neutralized. Its viscosity was I (Gardner-Holdt at 25° C.).

Example 5

The procedure of Example 1 was followed. After the initial reaction under alkaline conditions, the pH was lowered to 1.5–1.7 with hydrochloric acid, and maintained in this range thereafter. The reaction mixture was refluxed for 1 hour and cooled to 45° C., at which temperature the viscosity increased steadily. After about 40 minutes at 45° C., the viscosity was E (Gardner-Holdt at 25° C.) taken with a neutralized sample. The reaction mixture was then heated up to reflux. The viscosity decreased to A1 (measured as before). The heating-cooling cycle was carried out five times, with corresponding viscosity decrease and increase. It was finally neutralized after cooling at 45° C., to give a resin syrup of viscosity E (Gardner-Holdt at 25° C.).

Example 6

Forty six (46) parts of sodium metabisulfite was dissolved in 649 parts of a 37% aqueous formaldehyde solution and the pH of the solution adjusted to 9.4 with about 4 parts 1-N sodium hydroxide solution. Two hundred and forty (240) parts of urea was then added and the mixture refluxed for 30 minutes. The mixture was cooled to 80° C. and the pH lowered to 2.1 by adding about 11 parts 3-N sulfuric acid. The mixture was refluxed for one more hour. It was then cooled to 83°–84° C. and kept at this temperature for 12 minutes before it was neutralized with sodium hydroxide solution. The resulting neutralized resin syrup had a viscosity at 25° C. L (Gardner-Holdt).

Example 7

Fifty and five tenths (50.5) parts of sodium metabisulfite was dissolved in 649 parts of a 37% aqueous formaldehyde solution and the pH of the solution adjusted to 9.2 with 10% sodium hydroxide. Two hundred and forty (240) parts of urea was added and the mixture refluxed for 30 minutes. The mixture was cooled to 80° C. and 14.8 parts of 10% sulfuric acid was added to lower the pH of the solution to 2.5, which was measured with one volume of sample in 2 volumes of water. The reaction mixture was maintained at reflux temperature for 1 hour. Its pH was then adjusted to 3.8 and the syrup cooled to 70° C. and held at this temperature. Samples taken every 5 minutes and neutralized immediately had the following viscosities (Gardner-Holdt at 25° C.).

| Sample | Viscosity |
|---|---|
| 1 | D |
| 2 | F-G |
| 3 | G-H |
| 4 | I+ |
| 5 | K |
| 6 | K |
| 7 | L |
| 8 | O |

Example 8

One hundred sixty eight parts of sodium metabisulfite was dissolved in 1,298 parts of a 37% aqueous formaldehyde solution, and the pH of the solution adjusted to 9.1 by the addition of 5.1 parts of 10% sodium hydroxide solution. To this solution there was then added 480 parts of urea. This mixture was refluxed for about 30 minutes in a suitable vessel, equipped with a stirrer, a thermometer, and a reflux condenser. The pH of the solution was then lowered to 2.4 by the addition of 11.5 parts of 10% hydrochloric acid. The reaction mixture was refluxed for an additional hour and then cooled to approximately 60° C. for 10 minutes before it was neutralized with 10% sodium hydroxide solution. The viscosity of the resulting resin syrup was I (Gardner-Holdt at 25° C.).

Two hundred parts of the syrup was warmed up to 60° C. and acidified with 0.8 part of oxalic acid. It was applied on wood by dipping. After cooling to room temperature, the coating set within a few minutes. The coating was repeated twice. A hard, strong, and glossy finish was obtained.

Pieces of wood coated with the acidified resin after being clamped together and cooled to room temperature, glued together with an excellent bond.

Example 9

Forty eight parts of sodium metabisulfite was dissolved in 324 parts of a 37% aqueous formaldehyde solution and the pH adjusted to 9.1. One hundred twenty parts of urea and 10 parts of water were added, and the reaction mixture was heated at reflux temperature for 30 minutes, after which it was cooled to 80° C., and the pH lowered to 2.3 with 10% sulfuric acid, the pH being measured with 1 volume of sample dissolved in 2 volumes of water. The mixture was then refluxed for approximately one hour. The pH of the reaction mixture was then adjusted to approximately 2.6 and the mixture cooled to between 60°–70° C., and held at that temperature for approximately one hour. It was neutralized with sodium hydroxide. The resinous syrup obtained in this manner had a viscosity of M.

Example 10

Seventy two parts of sodium metabisulfite was dissolved in 324 parts of a 37% aqueous formaldehyde solution, and the pH adjusted to 9.05. Thirty parts of water and 120 parts of urea were added and the reaction mixture was heated to 98° C., at which temperature refluxing began. The mixture was held at reflux for approximately 30 minutes, after which it was cooled to 80° C., and the pH lowered to approximately 2.5 with 10% sulfuric acid, the pH being measured with 1 volume of sample dissolved in 2 volumes of water. Refluxing was continued for approximately one hour. The pH was adjusted to 1.9 with sulfuric acid and the mixture was cooled to between 40°–45° C., and held at that temperature for one hour, and then at 25° C. for 40 minutes. It was then neutralized with sodium hydroxide to yield a resinous syrup having a viscosity of M (Gardner-Holdt at 25° C.).

*Example 11*

Four hundred eighty parts of freshly prepared dimethylol urea, 46 parts of sodium metabisulfite, and 410 parts of water were heated with stirring in a suitable vessel equipped with thermometer, stirrer, and reflux condenser. When the temperature had reached 70°–80° C., a clear solution resulted. The pH of the solution was between 8 and 9, and gradually fell as heating continued. As soon as the mixture reached reflux, the pH was adjusted to 2.5 by the addition of 10% hydrochloric acid. The mixture was then refluxed for approximately 50 minutes. Thereafter it was cooled down to about 85° C. with the pH being first adjusted to between 3.8–4.4 by the addition of 10% sodium hydroxide solution. When the desired viscosity had been obtained, the pH was adjusted to 7.8 with additional 10% sodium hydroxide solution.

Although satisfactory resins may be prepared with 1.5 to 3 mols of formaldehyde per mol of urea, it is preferred to employ urea-formaldehyde in the portions of approximately 2.0–2.8 mols of formaldehyde per mol of urea, and when quantities of formaldehyde below this preferred ratio is employed, it is usually necessary to add water thereto, or use a comparatively large amount of bisulfite, in order to obtain satisfactory products, and in no case, should the ratio be extended below approximately 1.5 mols of formaldehyde per mol of urea. When the molar ratio is extended above 2.8 mols of formaldehyde per mol of urea, a substantially longer period of time at lower pH and temperature is required for effecting viscosity increase. The amount of bisulfite used does not appear to be critical. However, a minimum amount, about 5% on the weight of urea, must be used to make the resulting resin water-soluble. Furthermore, the proportion of bisulfite, for a given ratio of urea to formaldehyde, affects the operating pH and temperature during the aging period to a considerable degree. In general, a lower pH and a lower temperature are more convenient with greater proportion of bisulfite. Bisulfite and metabisulfite can be used indiscriminately, with due consideration for their purity and molecular constitution.

There are various ways of effecting the desired reaction. For instance, the bisulfites may be added at the beginning of the reaction or after the initial urea-aldehyde reaction under alkaline condition, but it is usually more convenient to mix the urea, aldehyde, and sulfite, effect addition reaction under alkaline condition, acidify to desired pH, and age under proper temperature and pH conditions.

The resins of this invention in the syrup stage are particularly advantageous in paper treatment, especially as wet strength addition compounds, and they are also useful as surfacing compositions and adhesives, and as a shrink-proofing agent for textiles. When used as a surface coating or adhesive, the resin is maintained at a temperature above viscosity increase, and additional acid may be added if the syrup has previously been neutralized. Any of the acid catalysts such as oxalic acid or salts such as ammonium chloride and the like, in an amount sufficient to effect catalytic action. Prior to cooling and neutralizing the resin syrup, however, the syrup will remain liquid indefinitely if kept at the elevated temperature. This acidified syrup, either by reaction or reacidification, may be applied directly as surfacing finish to form a film in a very short time upon cooling to room temperature and several coatings may be applied thereto, allowing each individual coat to set. The finished article presents a very hard, strong surface finish. These low pH and warm resin syrups may also be applied as an adhesive in the usual manner, and after clamping, the bond sets to a firmly bonded article in approximately ½ hour, upon cooling to room temperature.

In addition to the above-mentioned utilities, the resin syrups may be permitted to set by cooling, and when such is permitted, an insoluble, infusible, anionic resin is obtained which is useful in ion exchange beds.

I claim:

1. A process for preparing a water soluble urea resin comprising reacting urea, an aqueous solution of formaldehyde, and an alkali metal salt of sulfurous acid at reflux temperature for at least 30 minutes and at a pH varying between 8 and 9.4, adjusting the pH to a point within the range of 1–4, heating the reaction mixture again at reflux temperatures for approximately 1 hour, thereafter cooling, while maintaining a pH of 1–4, to a temperature between 25° C. and 85° C., thereby effecting an increase in viscosity, wherein the sulfurous acid salt is present in an amount varying between 5% and 60% by weight based on the total weight of urea and wherein the urea and formaldehyde are present in a mol ratio of about 1:2–1:2.8, respectively.

2. A process for preparing a water soluble urea resin comprising reacting urea, an aqueous solution of formaldehyde, and sodium meta bisulfite at reflux temperature for at least 30 minutes and at a pH varying between 8 and 9.4, adjusting the pH to a point within the range of 1–4, heating the reaction mixture again at reflux temperatures for approximately 1 hour, thereafter cooling, while maintaining a pH of 1–4, to a temperature between 25° C. and 85° C., thereby effecting an increase in viscosity, wherein the sodium meta bisulfite is present in an amount varying between 5% and 60% by weight based on the total weight of urea and wherein the urea and formaldehyde are present in a mol ratio of about 1:2–1:2.8, respectively.

3. A process for preparing a water soluble urea resin comprising reacting urea, an aqueous solution of formaldehyde, and sodium bisulfite at reflux temperature for at least 30 minutes and at a pH varying between 8 and 9.4, adjusting the pH to a point within the range of 1–4, heating the reaction mixture again at reflux temperatures for approximately 1 hour, thereafter cooling, while maintaining a pH of 1–4, to a temperature between 25° C. and 85° C., thereby effecting an increase in viscosity, wherein the sodium bisulfite is present in an amount varying between 5% and 60% by weight based on the total weight of urea and wherein the urea and formaldehyde are present in a mol ratio of about 1:2–1:2.8, respectively.

4. A process for preparing a water soluble urea resin comprising reacting urea, an aqueous solution of formaldehyde and an alkali metal salt of sulfurous acid at reflux temperature for at least 30 minutes and at a pH varying between 8 and 9.4, adjusting the pH to a point within the range of 1–4, heating the reaction mixture again at reflux temperatures for approximately 1 hour, thereafter cooling, while maintaining a pH of 1-4, to a temperature between 25° C. and 85° C., thereby effecting an increase in viscosity to a point within the range of A-O on the Gardner-Holdt scale, wherein the sulfurous acid salt is present in an amount varying between 5% and 60% by weight based on the total weight of urea and wherein the urea and formaldehyde are present in a mol ratio of about 1:2–1:2.8, respectively.

5. A process for preparing a water soluble urea resin comprising reacting urea, an aqueous solution of formaldehyde and an alkali metal salt of sulfurous acid at reflux temperature for at least 30 minutes and at a pH varying between 8 and 9.4, adjusting the pH to a point within the range of 1-4, heating the reaction mixture again at reflux temperatures for approximately 1 hour, thereafter cooling, while maintaining a pH of 1-4, to a temperature between 25° C. and 85° C., thereby effecting an increase in viscosity to a point within the range of A-O on the Gardner-Holdt scale, neutralizing and spray drying at a temperature below 300° C., wherein the sufurous acid salt is present in an amount varying between 5% and 60% by weight based on the total weight of urea and wherein the urea and formaldehyde are present in a mol ratio of about 1:2–1:2.8, respectively.

TZENG-JIUEQ SUEN.

REFERENCES CITED

The following references are of record in the file of this patent:

UNITED STATES PATENTS

| Number | Name | Date |
| --- | --- | --- |
| 2,407,599 | Auten | Sept. 10, 1946 |
| 2,412,855 | Auten | Dec. 17, 1946 |

FOREIGN PATENTS

| Number | Country | Date |
| --- | --- | --- |
| 114,481 | Sweden | July 10, 1945 |